United States Patent
Jacumet

(10) Patent No.: US 8,218,034 B2
(45) Date of Patent: Jul. 10, 2012

(54) METHOD FOR AUTOMATICALLY CORRECTING FRAME FAULTS IN VIDEO ASSIST FRAMES OF A VIDEO ASSIST SYSTEM

(75) Inventor: Klaus Jacumet, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 385 days.

(21) Appl. No.: 12/087,166

(22) PCT Filed: Jan. 3, 2007

(86) PCT No.: PCT/EP2007/000153

§ 371 (c)(1),
(2), (4) Date: Jun. 27, 2008

(87) PCT Pub. No.: WO2007/077226

PCT Pub. Date: Jul. 12, 2007

(65) Prior Publication Data

US 2009/0002511 A1 Jan. 1, 2009

(30) Foreign Application Priority Data

Jan. 4, 2006 (WO) ................ PCT/DE2006/000014
Jul. 4, 2006 (DE) .......................... 10 2006 031 757

(51) Int. Cl.
*H04N 5/217* (2006.01)

(52) U.S. Cl. ................... 348/241; 396/150; 348/222.1; 250/201.9

(58) Field of Classification Search .................. 348/247, 348/241; 250/208.1
See application file for complete search history.

(56) References Cited

U.S. PATENT DOCUMENTS

| | | | |
|---|---|---|---|
| 4,574,314 A | 3/1986 | Weinblatt |
| 4,584,704 A | 4/1986 | Ferren |
| 4,660,091 A | 4/1987 | Nutting |
| 4,866,465 A | 9/1989 | Gallegos |
| 4,928,171 A | 5/1990 | Kline |
| 4,963,017 A | 10/1990 | Schneiter et al. |

(Continued)

FOREIGN PATENT DOCUMENTS

AT 406 800 B 9/2000

(Continued)

OTHER PUBLICATIONS

International Search Report, dated May 15, 2007, corresponding to PCT/EP2007/000153.

(Continued)

*Primary Examiner* — Sinh Tran
*Assistant Examiner* — Paul Berardesca
(74) *Attorney, Agent, or Firm* — Christie, Parker & Hale, LLP

(57) ABSTRACT

A method for automatically correcting frame faults in video assist frames of a video assist system in a video beam path branched off from a capture beam path of a motion-picture camera, a ground glass screen being arranged in said video beam path, is provided. The video assist system is calibrated by capturing at least one video assist frame of a single-colored, unstructured and uniformly illuminated, flat capture object for a predefined diaphragm aperture of the camera lens and storing it as a video assist calibration frame in a frame store, wherein the stored and inverted video assist calibration frame is superimposed on the video assist frames captured after the calibration.

51 Claims, 7 Drawing Sheets

U.S. PATENT DOCUMENTS

| | | | |
|---|---|---|---|
| 5,047,861 A * | 9/1991 | Houchin et al. ............... 348/247 |
| 5,076,686 A | 12/1991 | Preston |
| 5,082,362 A | 1/1992 | Schneiter |
| 5,096,289 A | 3/1992 | Mogamiya et al. |
| 5,153,926 A | 10/1992 | Jansson et al. |
| 5,336,899 A | 8/1994 | Nettleton et al. |
| 5,513,276 A | 4/1996 | Theodoracatos |
| 6,148,151 A | 11/2000 | Bauer |
| 6,161,933 A | 12/2000 | Tschida et al. |
| 6,353,461 B1 | 3/2002 | Shore et al. |
| 6,734,900 B2 | 5/2004 | Mayhew |
| 6,749,304 B2 | 6/2004 | Jacumet |
| 6,757,021 B1 | 6/2004 | Nguyen-Nhu |
| 6,903,775 B2 | 6/2005 | Senda |
| 6,989,890 B2 | 1/2006 | Riegl et al. |
| 7,167,280 B2 | 1/2007 | Bogdanowicz et al. |
| 7,342,650 B2 | 3/2008 | Kern et al. |
| 2002/0003965 A1 | 1/2002 | Landelle et al. |
| 2002/0167603 A1* | 11/2002 | Kato et al. .................... 348/341 |
| 2003/0086624 A1 | 5/2003 | Garcia |
| 2003/0193658 A1 | 10/2003 | Uomori et al. |
| 2004/0085445 A1 | 5/2004 | Park |
| 2005/0068445 A1* | 3/2005 | Steinberg et al. ............. 348/335 |
| 2005/0068450 A1* | 3/2005 | Steinberg et al. ............. 348/335 |
| 2005/0078173 A1* | 4/2005 | Steinberg et al. .......... 348/14.12 |
| 2006/0061753 A1 | 3/2006 | Harris et al. |
| 2006/0115177 A1* | 6/2006 | Ishiga ........................... 382/275 |
| 2006/0125931 A1 | 6/2006 | Jacumet |
| 2007/0103567 A1* | 5/2007 | Wloka .................... 348/231.99 |
| 2008/0007635 A1* | 1/2008 | Hsu et al. ...................... 348/247 |

FOREIGN PATENT DOCUMENTS

| | | |
|---|---|---|
| CH | 500 504 | 12/1970 |
| DE | 1 228 510 | 11/1966 |
| DE | 42 05 397 A1 | 8/1993 |
| DE | 196 29 484 A1 | 1/1998 |
| DE | 100 20 307 A1 | 10/2001 |
| DE | 103 01 714 A1 | 7/2004 |
| EP | 0 501 075 A2 | 9/1992 |
| EP | 0 574 105 A1 | 12/1993 |
| EP | 0 575 022 B1 | 12/1993 |
| EP | 0 765 077 A2 | 3/1997 |
| EP | 0 884 895 A2 | 12/1998 |
| EP | 0 910 814 B1 | 4/1999 |
| EP | 0 942 305 A1 | 9/1999 |
| EP | 1 615 451 A2 | 1/2006 |
| WO | WO 96/31050 | 10/1996 |

OTHER PUBLICATIONS

Yu, "Practical Anti-vignetting Methods for Digital Cameras," IEEE Transactions on Consumer Electronics, IEEE Service Center, New York, NY, vol. 50, No. 4, Nov. 2004, pp. 975-983, XP001224730.

CINELOGIC, "Cinelog Digital Video Assist Software," Mar. 15, 2006, pp. 1-9, XP-002372608, URL:http://web.archive.org/web/20020205062357/http://videoassist.com/software.htm.

English translation of International Preliminary Report on Patentability dated Sep. 12, 2008 for corresponding International application No. PCT/EP2007/000153.

Crowell, "Lectures in Physics—Vector Notation," Light and Matter, Mar. 26, 2010, (5 pages).

* cited by examiner

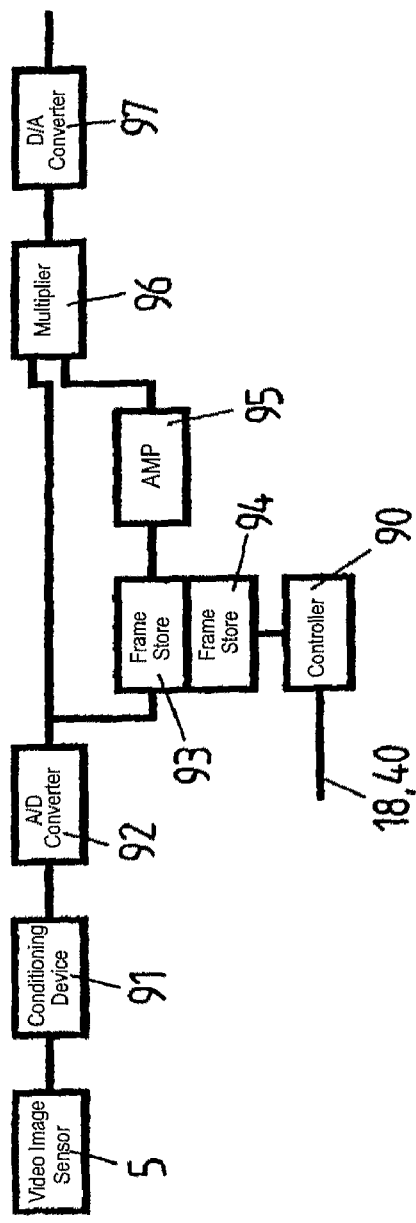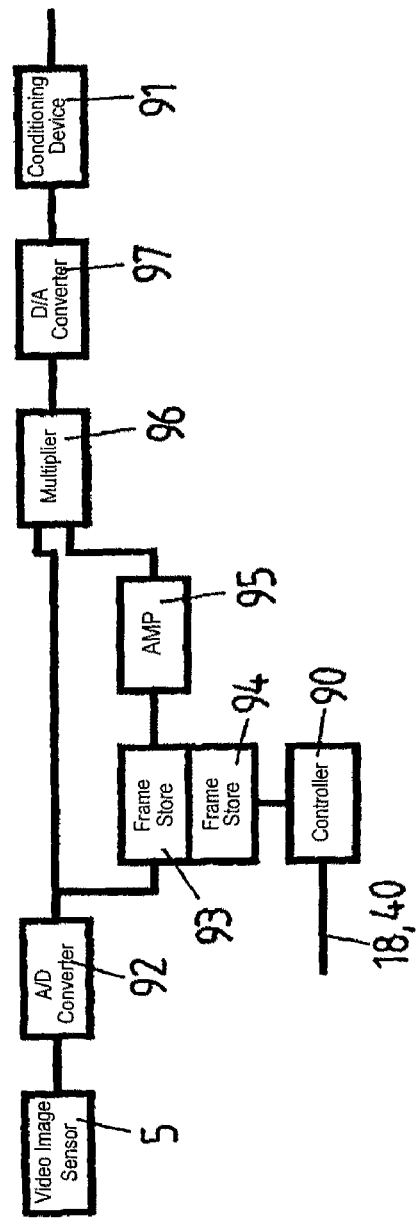

METHOD FOR AUTOMATICALLY CORRECTING FRAME FAULTS IN VIDEO ASSIST FRAMES OF A VIDEO ASSIST SYSTEM

CROSS-REFERENCE TO A RELATED APPLICATION

This application is a National Phase Patent Application of International Patent Application Number PCT/EP2007/000153, filed on Jan. 3, 2007, which claims priority of International Patent Application Number PCT/DE2006/000014, filed on Jan. 4, 2006, and German Patent Application Number 10 2006 031 757.2, filed on Jul. 4, 2006.

BACKGROUND

The invention relates to a method for automatically correcting frame faults in video assist frames of a video assist system, and to an apparatus for carrying out the method.

U.S. Pat. No. 4,928,171 discloses a video assist system for a motion-picture camera, in which a video image sensor is arranged in an optical beam path of the motion-picture camera, which is interrupted periodically depending on the frame capture frequency of the motion-picture camera. A video assist system of this type serves to generate a video image in parallel with the exposure of film frames of the motion-picture film, which video image on the one hand enables image viewing independently of looking into the camera viewfinder during film capture and on the other hand facilitates the postprocessing of the exposed motion-picture film on the basis of the recorded video sequences.

For this purpose, part of the capture beam path of the motion-picture camera is branched off into a video beam path and directed to the video image sensor of the video assist system or a video camera. In this case, the camera lens of the motion-picture camera projects a frame in the image plane of the motion-picture film, which is moved intermittently for example at a film transport rate of 24 frames per second, if a rotating mirror diaphragm arranged in the capture beam path of the motion-picture camera downstream of the camera lens, with a diaphragm aperture sector, releases the capture beam path during the exposure of a film frame. In the time in which the motion-picture film is transported further by a film frame division, the diaphragm mirror sector of the rotating mirror diaphragm conceals the capture beam path to the image plane and directs the film frame onto the plane of a ground glass screen or fiber plate, from which the image that arises there is imaged on the video image sensor via a video assist lens.

The video image sensor integrates the light of the video beam path that falls onto its light-sensitive layer. The integrated signals are periodically read out from the video image sensor and represented as video output signals on a video monitor or stored on a suitable storage medium.

Situated between the ground glass screen or fiber plate and the video assist lens is at least one further beam splitter which branches off the image of the ground glass screen to an eyepiece via which a cameraman can view the film frame on the ground glass screen. Via a further beam splitter, a possibly illuminated format depiction can be imaged on the ground glass screen, which makes it easier for the cameraman to identify the frame center and the frame limits of the exposed film frame primarily in the dark.

The ground glass screens used for visually assessing an image or motif to be captured and for imaging the video assist frames are frosted either by a grinding process or in a chemical etching process, while fiber plates are produced from a bundle of individual light-guiding fibers that are oriented parallel. Both a ground glass screen and a fiber plate have a structure, however, which is disturbing particularly in the case of small-format frames such as are customary when capturing films. Although these structures can be reduced in the case of a ground glass screen by using a particularly fine abrasive grain during the grinding process, the ground glass screen becomes too transparent as a result, whereby the assessment of the optimum focus setting becomes impossible and the image brightness becomes nonuniform. The same disadvantages occur in the case of ground glass screens which are coated with a transparent lacquer in order to reduce the granularity on their matt surface.

Fiber plates have the advantage of a ground glass screen that the structure is smaller, but they are more expensive than ground glass screens and, particularly at relatively small apertures of the imaging camera lens, reveal a regular, usually honeycomb-shaped, structure that disturbs the artistic assessment of the image or motif. In this case, the structures of the ground glass screen or fiber plate are discernible all the more clearly, the more the camera lens is stopped down.

In order to improve the image quality of an image imaged on a ground glass screen or fiber plate, it is known from DE 100 20 307 to connect the ground glass screen or fiber plate to a drive device which moves the ground glass screen or fiber plate in oscillatory fashion at a frequency lying significantly above the temporal resolution capability of the eyes at approximately 60 hertz. With the aid of such an arrangement, although the appearance of the granularity and the honeycomb-shaped structure can be prevented or at least significantly reduced, the mechanical movement of the ground glass screen or fiber plate can be realized only with considerable outlay within a motion-picture camera and is also unable to solve the problem of optical vignetting explained below.

Before the video beam path branched off from the capture beam path reaches the video image sensor, the beam path passes firstly through the camera lens and then through the video assist lens. If there were no ground glass screen present between the two lenses, then it would be necessary, in order to avoid a keyhole effect, in which a decrease in brightness toward the edge of the video assist frame, that is to say optical vignetting, occurs, to meet the condition stipulating that the exit pupil of the camera lens lies in the entrance pupil of the video assist lens and said entrance pupil is smaller than the exit pupil of the camera lens. This condition cannot be met in practise, however, because there are a large number of camera lenses from the same or different manufacturers and the exit pupils of the respective camera lenses lie at different locations. One major reason for this is that the pupil position of a camera lens is irrelevant to the latter's essential task of imaging a capture object on the motion-picture film.

However, even when a ground glass screen or fiber plate is arranged between the camera lens and the video assist lens, optical vignetting or a brightness decrease toward the edge of the video assist frame occurs because the ground glass screen does not fully compensate for the different pupil positions between the camera lens and the video assist lens. Only an ideal ground glass screen behaving like a Lambertian emitter, whose luminance is constant in all directions and thus forms an ideal diffusely emitting area, would be able to compensate for the different pupil positions between the camera lens and the video assist lens and thus fully eliminate the keyhole effect. In this case, however, light would be sent into all spatial segments and only a fraction would come into the entrance pupil of the video assist or the eyepiece at the optical viewfinder, whereby a very dark image would arise there.

A further component-dictated frame fault in the generation of video assist frames by means of a video assist system is caused by the inherent noise of the video image sensor comprising a semiconductor component and occurs in or at different locations or pixels of the video assist frame in the case of successive video frames.

SUMMARY

It is an object of the present invention to specify a method for automatically correcting frame faults of the type mentioned in the introduction which eliminates or minimizes ground glass screen-based frame faults without restriction in the selection of parts or components of the motion-picture camera, the camera accessories or the video assist system and without additional hardware outlay.

The method according to an exemplary embodiment of the invention reduces or eliminates ground glass screen structures, on the one hand, and on the other hand obtains a uniformly bright video assist frame over the entire frame area without this imposing particular demands on the quality of the ground glass screen, type and quality of the camera lens or of the video assist lens or an additional hardware outlay being required there.

The exemplary solution according to an exemplary embodiment of the invention is based on the fault analysis that the ground glass screen or fiber plate structure visible on the video assist frame can be attributed to the fact that the ground glass screen or fiber plate superimposes on the capture frame a discrete bright/dark pattern similar to a "fixed pattern noise", as is known from the field of semiconductor image sensors. This structure is stationary, the ratio of disturbance signal to noise signal depending on the aperture of the camera lens, such that the ground glass screen or fiber plate structure is hardly discernible in the case of a large diaphragm aperture of the camera lens, while when the camera lens is stopped down, that is to say in the case of a small diaphragm aperture, the capture beams fall onto the ground glass screen or fiber plate in a very much more parallel fashion, such that the structures of said screen or plate have a greater and greater effect.

By contrast, the vignetting or keyhole effect depends on the following factors:
1. on the video assist lens used;
2. on the chosen diaphragm aperture of the video assist lens;
3. on the camera lens used;
4. on the chosen diaphragm aperture of the camera lens.

Since the video assist lens used for the video assist system respectively employed is known, only points 2 to 4 remain as influencing variables for the vignetting or keyhole effect.

According to an exemplary embodiment of the invention, both problems are solved by calibrating the video assist system before film frames are captured, by capturing a homochromatic, unstructured and uniformly illuminated background, for example a neutral grey, uniformly illuminated sheet of paper, for different diaphragm apertures of the camera lens. During frame capture, the respective settings of the camera lens, in particular the diaphragm apertures of the camera lens, are fed to a controller controlling the calibration and, having been assigned to the frame capture instances, are stored in a frame store. After the calibration of the video assist system, an inverted image of the stored video assist calibration frames is superimposed on the video assist frames branched off from the capture beam path in a manner dependent on the diaphragm aperture of the camera lens and the "fixed pattern noise" of the ground glass screen structure is thereby removed.

The same calibration steps are also used for eliminating the vignetting or keyhole effect, parameters 2 to 4 mentioned above additionally being taken into account. The brightness ratios measured during the calibration on the individual video assist frames produce a set of curves with parameters 2 to 4 mentioned, which are used to calculate correction values pixel by pixel.

In order to separate the influence of the ground glass screen structure from the influence of vignetting in the frame faults that occur and additionally also to take account of the unavoidable inherent noise of the video image sensor, the solution according to the invention is based on the following consideration.

The ground glass screen structure represents a local disturbance in a manner similar to the randomly occurring inherent noise that changes from frame to frame, while vignetting is a curve which goes over the entire frame and on which the ground glass screen structure is superimposed as a higher frequency. In order to eliminate the high-frequency components of the ground glass screen structure, correction of the vignetting is achieved by averaging at a predetermined location of the video assist frames over a specific number of pixels, for example over a pixel group of 10 times 10 pixels. For compensation of the ground glass screen structure, once again an array or a pixel group of 10 times 10 pixels, for example, is selected, the average value of said pixel group is determined and a correction factor is determined for each pixel from the latter's deviations from the average value.

In order to correct the randomly occurring inherent noise, by contrast, with unchanged setting parameters of the camera lens and of the video assist lens, an average value of the brightness over a plurality of video assist frames is determined and it is assigned to the individual pixels of the video assist frames that are subsequently branched off from the film capture beam path.

Specifically, the following steps are carried out in order to eliminate or in order to reduce the ground glass screen-based frame faults, said steps being based on the basic method for automatically correcting frame faults in video assist frames of a video assist system in which the video assist system is calibrated by capturing at least one video assist frame of a single-colored, unstructured and uniformly illuminated, flat capture object for a predefined diaphragm aperture of the camera lens and storing it as a video assist calibration frame in a frame store, and the stored and inverted video assist calibration frame is superimposed on the video assist frames captured after the calibration.

Since the calibration cannot be carried out once for any video assist systems, because the ground glass screen structure depends on the ground glass screen respectively used (the designation "ground glass screen" and "ground glass screen structure" hereinafter also includes "fiber plate" and "fiber plate structure") and is an individual structure of said ground glass screen and, moreover, the positioning of the video image sensor can be set in relation to the ground glass screen used, the calibration must be repeated whenever the ground glass screen is exchanged or the position of the video image sensor with respect to the ground glass screen is altered. In a practical embodiment, therefore, depending on the measurement system used, a calibration frame or a plurality of calibration frames is or are stored upon initiation of the user and the corresponding correction factors are determined, wherein the respective calibration operation can be carried out very rapidly.

During calibration it was ascertained that the ground glass screen structure stands out with respect to the inherent noise of the video image sensor when the camera lens is stopped down, that is to say in the case of small diaphragm apertures of the camera lens, in which case, when viewing individual frames, the inherent noise has a similar effect to the frame faults caused by the ground glass screen structure. In order to make the inherent noise distinguishable from the ground glass screen structure despite the small influence of said noise on the occurrence of frame faults in video assist frames, rather than taking account of just one frame for a predefined diaphragm aperture of the camera lens during calibration, a plurality of frames are taken into account. Since the inherent noise is distributed randomly from frame to frame in the video assist frames, while the ground glass screen structure is positionally invariable in accordance with the individual construction of the ground glass screen, a video assist frame averaged over a plurality of individual frames takes into account exclusively the ground glass screen structure and not the ground glass screen structure plus the inherent noise.

Furthermore, in order to correct the ground glass screen structure, a plurality of video assist calibration frames are captured for different settings of the camera lens and stored in conjunction with the respective lens setting and, depending on the respective setting of the camera lens, a stored and inverted video assist calibration frame assigned to said setting of the camera lens is superimposed on the video assist frames captured after the calibration.

According to a further exemplary feature of the invention, what are suitable as different settings of the camera lens are different diaphragm apertures of the camera lens which are used in capturing a plurality of video assist calibration frames for the calibration of the video assist system. The video assist calibration frames are stored in conjunction with the respective diaphragm aperture of the camera lens and, depending on the respective diaphragm aperture of the camera lens, are superimposed as inverted video assist calibration frame on the video assist frames captured after the calibration.

In order to correct the vignetting effect, a plurality of video assist calibration frames are captured using different camera lenses, different diaphragm apertures of the camera lenses and different diaphragm apertures of a video assist lens and the brightness values of a plurality of areas of the video assist calibration frames depending on the camera lenses used, the different diaphragm apertures of the camera lenses and the different diaphragm apertures of the video assist lens are stored.

By contrast, in order to eliminate or reduce the inherent noise of the video image sensor, the brightness values of the pixels of a plurality of video assist calibration frames captured using the same camera lens are captured with the setting of the camera lens, in particular the diaphragm aperture of the camera lens, remaining constant and the setting of the diaphragm aperture of the video assist lens remaining constant and an average value of the brightness of all the pixels of the captured video assist calibration frames is formed, which is assigned to the individual pixels of the video assist frames captured after the calibration.

In practise, in order to filter out the ground glass screen structure from the video assist frames, brightness values of the individual pixels of a video assist calibration frame are stored together with the address of the individual pixels in a frame store, the stored brightness values of the pixels of a pixel group are used to form an average value of the brightness of said pixel group, a correction factor is calculated from the deviation of the brightness values of individual pixels from the average value of the brightness of the pixel group, and the brightness values of the pixels of the video assist frames captured after the calibration are combined with the correction factor and output as corrected pixel brightness values to a display or further processing unit.

In this case, in order to determine the correction factors, the brightness values of the individual pixels of a plurality of video assist calibration frames are captured for different settings of the camera lens and are stored in conjunction with the respective setting of the camera lens and the assigned addresses of the individual pixels in the frame store, an average value of the brightness of a predefined pixel group is formed, a correction factor $$V_{ME}=I_{PG}/I_N$$

is determined for each individual pixel for the respective setting of the camera lens, where $I_{PG}$ is the average value of the brightness of the predefined pixel group and $I_N$ is the brightness value of each individual pixel, and the individual pixels of the video assist frames captured after the calibration are multiplied by the correction factor $V_{ME}$.

In particular, the brightness values of the individual pixels of a plurality of video assist calibration frames are captured for different diaphragm apertures of the camera lens and are stored in conjunction with the respective diaphragm aperture or F-number and the assigned addresses of the individual pixels in the frame store, an average value of the brightness of a predefined pixel group is formed, a correction factor $$V_{MB}=I_{PG}/I_N$$

is determined for each individual pixel for the respective diaphragm aperture or F-number of the camera lens, where $I_{PG}$ is the average value of the brightness of the predefined pixel group and $I_N$ is the brightness value of each individual pixel, and the individual pixels of the video assist frames captured after the calibration are multiplied by the correction factor $V_{MB}$.

Since there is no variation in the brightness changes—attributable to the ground glass screen structure—of the individual pixels of the video assist frames on account of the ground glass screen individually used, but rather only in the brightness amplitude thereof, alternatively for approximate determination of the correction factors the brightness values of the pixels of a video assist calibration frame can be captured for the smallest possible diaphragm or largest possible F-number of the camera lens and can be stored in conjunction with the respective diaphragm aperture or F-number and the assigned addresses of the individual pixels in the frame store, a correction factor $$V_M=V_{MA}*C*BZ \text{ or } V_M=V_{MA}*C*BZ^2$$

can be determined for each individual pixel, where $V_{MA}$ is the correction factor for each individual pixel for maximum stopping down of the camera lens, C is a constant dependent on the video assist system, and BZ is the F-number, and the individual pixels of the video assist frames captured after the calibration can be multiplied by the correction factor $V_M$.

In this determination of the correction factors which simplifies the calibration, it is necessary to capture a correction frame of the video assist frame, that is to say a video assist calibration frame, and to determine the correction factor that can be allocated to each pixel, only once for a minimum possible diaphragm aperture of the camera lens, while all the other correction factors for the individual pixels of the video assist frames can be approximated mathematically.

A cross check of this approximation taking account of the formula mentioned above reveals that in the case of a large diaphragm aperture, that is to say for example in the case of an F-number of 2, the disturbances caused by the ground glass screen structure hardly have any effect because the influence of the correction factor is also small, while in the case of a large F-number of 32, for example, that is to say in the case of a small diaphragm aperture of the camera lens, the ground glass screen structure has a very great effect, which leads to a very high influence of the correction factors allocated to these diaphragm apertures.

Both the precise and the approximated determination of the correction factors can be used for correcting the ground glass screen structure only when the brightness difference between adjacent pixels of the video assist frames acquired does not exceed a predefined magnitude or a predefined percentage deviation, because even ground glass screens having coarse ground glass screen structures do not have an abrupt change in the brightness structures of adjacent pixels. If the brightness difference between adjacent pixels of the captured video assist calibration frames becomes too large, then it must be assumed that a format depiction is involved at these locations, said format depiction indicating the contours of the captured camera frame to the cameraman. No correction factor is determined at these locations of the video assist calibration frames, rather a correction factor equal to one is stored for the relevant pixels of the video assist calibration frame.

Therefore, an upper limit of 50% for a deviation of the brightness difference between adjacent pixels of a video assist calibration frame is defined as a criterion for the capture of the video assist calibration frames, that is to say that in the case of a larger deviation the correction factor "one" is stored for the relevant pixels.

Alternatively, it is possible to predefine a magnitude for the brightness deviation for which, upon being reached or exceeded, the correction factors "one" are stored for the relevant pixels of the video assist calibration frame.

Accordingly, the difference between the brightness values of adjacent pixels or pixel groups is determined and only those pixels for which the deviation of the brightness values is less than a predefined value are multiplied by a correction factor, or only those pixels for which the deviation of the brightness values of adjacent pixels is less than or equal to 50% are multiplied by a correction factor.

In order to correct the vignetting effect, during the calibration according to the basic method in accordance with the features of claim 1 taking account of the additional parameters of the video assist lens respectively used, the chosen diaphragm aperture of the video assist lens, the camera lens used and the chosen diaphragm aperture of the camera lens, the brightness values of a plurality of pixel groups of the video assist calibration frame or of the video assist calibration frames are captured for different camera lenses, different settings of the diaphragm aperture of the camera lens and different settings of the diaphragm aperture of the video assist lens and are stored together with the indication of the respective camera lens, the settings of the diaphragm aperture of the camera lens, the settings of the diaphragm apertures of the video assist lens and an addressing of the pixel groups in the frame store, in that a vignetting correction factor $$V_v = IG_{MAX}/IG_N$$

is determined for each pixel group and stored, where $IG_{MAX}$ is the brightness of the brightest pixel in the frame center of a video assist calibration frame and $IG_N$ is the brightness value of the relevant pixel group. The brightness values of the pixels of the video image sensor of the video assist system for the video assist frames captured after the calibration, depending on the camera lens used, the setting of the diaphragm aperture of the camera lens and the setting of the diaphragm aperture of the video assist lens are combined with the correction factor $V_v$.

In practise, the requisite sets of curves of the parameters or correction tables can be provided by the camera manufacturer, which necessitates suitable measuring devices but makes the sets of curves or correction tables determined usable for any motion-picture camera of the same type if the corresponding correction factors are determined in calibration measurement series and are provided for each camera user.

The correction tables or sets of curves of the abovementioned parameters that have been determined and defined in this way are transferred into a frame store of the video assist system, which can be done both during initial production and in the context of software updates. In the case of software updates, the relevant data can be made available over the Internet, for example, such that the camera user can download the respective up-to-date correction tables and store them in the video assist system.

In order to separate the influence of the ground glass screen structure, which represents a local disturbance like the inherent noise of the video image sensor, from the influence of vignetting, which can be represented as a curve which goes over the entire video image and on which the ground glass screen structure is superimposed with a higher frequency, in order to eliminate the high-frequency components of the ground glass screen structure, correction of the vignetting effect is achieved by averaging over a specific number of pixels, for example over a pixel group of 10 times 10 pixels, at a predetermined location of the video assist calibration frames. For the compensation of the ground glass screen structure, once again an array for a pixel group of 10 times 10 pixels, for example, is selected, the average value of said pixel group is determined and then the correction factors are determined for each pixel of the video assist calibration frames from the deviations from the average values.

This gives rise, for each pixel of a video assist calibration frame depending on the ground glass screen used and on the respective F-number or diaphragm aperture of the camera lens, to a correction factor $$V_{MB} = I_{PG\ 100}/I_N$$

for each individual pixel for a predefined F-number, where $I_{PG\ 100}$ indicates the average value over the pixel group of 10×10 equals 100 pixels, for example, and $I_N$ is the brightness value of each individual pixel.

This results overall, for each pixel of a video assist calibration frame, in the relationship $$U_{CORR} = U_{MEAS} * V_{MB} * V_V$$

where $U_{CORR}$ is the corrected brightness value of a pixel, $U_{MEAS}$ is the measured brightness value of a pixel, $V_{MB}$ is the correction factor dependent on the ground glass screen used and on the respective F-number or diaphragm aperture of the camera lens, and $V_V$ is the vignetting correction factor dependent on the respective camera lens, the setting of the diaphragm aperture of the camera lens and the setting of the diaphragm aperture of the video assist lens.

Using the abovementioned simplified formula for the correction of the ground glass screen structure with the smallest possible diaphragm aperture, the relation $$U_{CORR} = U_{MEAS} * V_V$$

can be used.

The method according to the invention for automatically correcting frame faults in a video assist frames of a video assist system can be used at various points in the generation of the video assist frame.

In a first exemplary variant, the video frames generated by the video assist system are converted into a correctly colored video frame and the frequency compensation between the frame capture frequency of the motion-picture camera and the video standard of the video assist system is performed. This is followed by acquiring the video assist calibration frames for determining and storing the correction factors and, after the calibration, carrying out multiplication by the correction values of the captured brightness values of the individual pixels.

Accordingly, an apparatus for carrying out the method comprises a video assist system connected to a motion-picture capture and containing a video assist lens, which is directed at a ground glass screen arranged in a beam path tapped off from the film capture beam path of the motion-picture camera, a video image sensor and a controller, to which setting and status data of a camera lens arranged in the film capture beam path of the motion-picture camera are applied and which is connected to a frame store. The output of the video image sensor of the video assist system is connected to the input of an image or color conditioning, the output of which is connected via an A/D converter both to the frame store and to a first input of a multiplier, the second input of which is connected to the output of an amplifier connected to the output of the frame store and the output of which is connected to the input of a D/A converter.

In one exemplary variant, the raw data of the video image sensor are stored and the correction is carried out in the film capture operating mode. The frequency compensation likewise takes place at this point in the image processing, while the conversion of the colors and the conditioning of the video signal take place subsequently.

Accordingly, in this variant, the output of the video image sensor is connected via an A/D converter both to the frame store and to a first input of a multiplier, the second input of which is connected to the output of an amplifier connected to the output of the frame store and the output of which is connected via a D/A converter to the input of an image or color conditioning.

An exemplary advantageous embodiment of the apparatus according to an exemplary embodiment of the invention for carrying out the method for automatically correcting frame faults in video assist frames of a video assist system is characterized in that the storage of the correction factors for correcting the ground glass screen structure is effected separately from the storage of the correction factors of the vignetting effect in other address areas of a frame store since the respective correction factors are determined in different, mutually separate calibration processes and at different times.

The method according to an exemplary embodiment of the invention and the apparatus according to an exemplary embodiment of the invention are suitable both for analog and for digital video assist systems, wherein the parameters of the camera lens that are required for determining the correction factors in the calibration process and for taking them into account in the real film capture operating mode and the settings of said camera lens are obtained in accordance with U.S. Pat. No. 6,148,151 A, for example, which provide inter alia information about the lens type and the respective diaphragm aperture.

BRIEF DESCRIPTION OF THE DRAWINGS

Further details of the invention and the considerations on which the invention is based will be explained in more detail on the basis of a plurality of exemplary embodiments illustrated in the figures, in which:

FIG. 3 shows a block diagram of a video assist system with image or color conditioning before determining and taking account of correction factors for correcting ground glass screen-based frame faults.

FIG. 4 shows a block diagram of a video assist system with storage of raw data of the video image sensor and performance of the image or color conditioning after determining or taking account of correction factors for correcting the inherent noise of the video image sensor, the ground glass screen structure and the vignetting effect.

DETAILED DESCRIPTION

Figure 1:
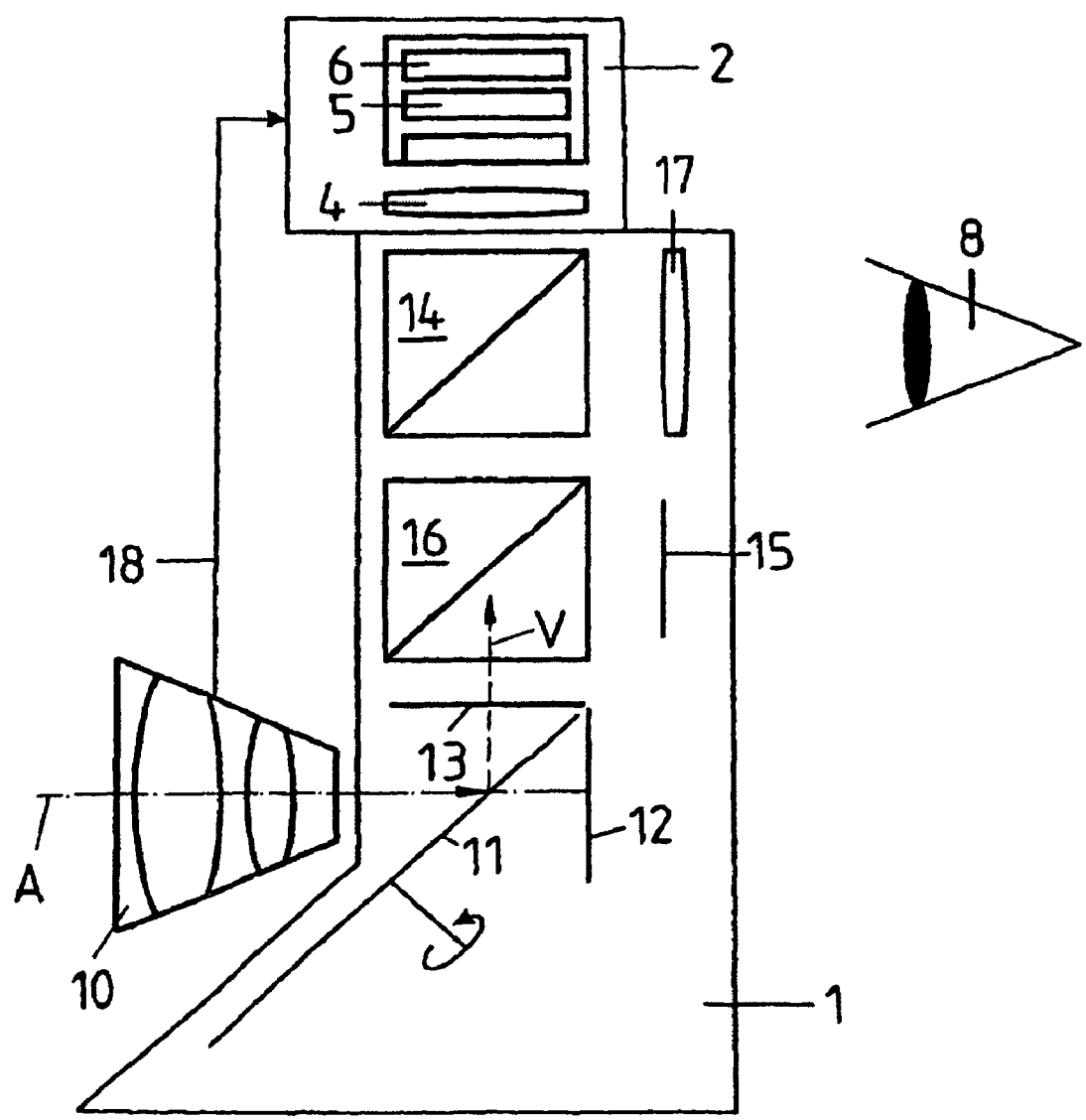
FIG. 1 shows a schematic block diagram of the optical functional elements and of the beam path of a motion-picture camera with an analog video assist system.
Figure 2:
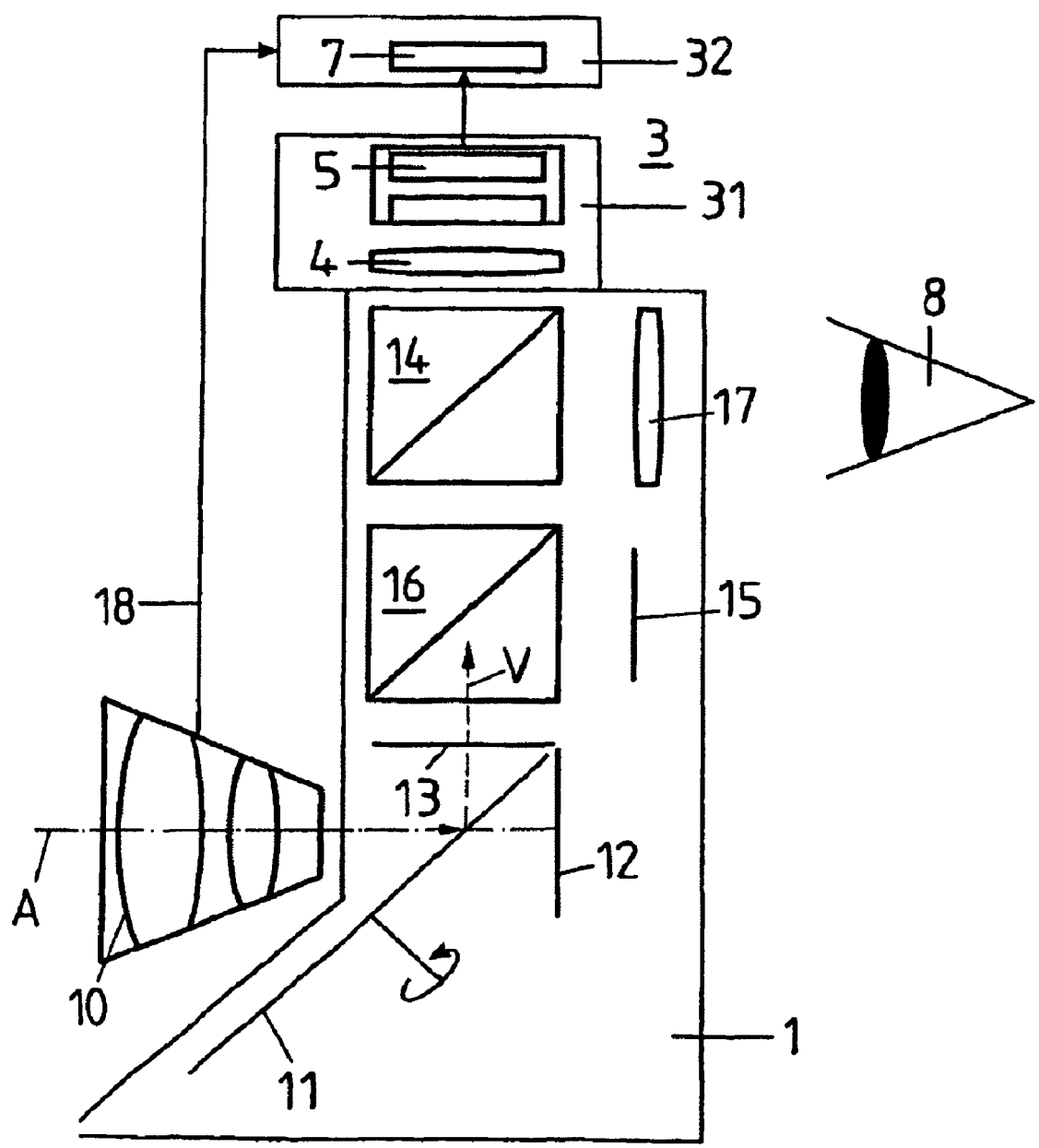
FIG. 2 shows a schematic block diagram of the optical functional elements and of the beam path of a motion-picture camera with a digital video assist system.

The optical systems of a motion-picture camera 1 with a video assist system 2, 3 which are illustrated schematically in FIGS. 1 and 2 show a camera lens 10, through which a capture beam path A enters into the motion-picture camera 1 and impinges on a rotating mirror diaphragm 11, which is composed of a circular-disc-shaped mirror surface and a diaphragm adjusting blade that is arranged coaxially with respect to the circular-disc-shaped mirror surface and is adjustable with respect to the mirror surface, such that a variable mirror surface or a diaphragm aperture angle of 0° to 180° of the rotating mirror diaphragm 11 can be set. If the capture beam path A impinges on the aperture or bright sector of the rotating mirror diaphragm 11, then it passes to a film plane 12, which is defined by an image window at which a motion-picture film is guided along in a film channel. During the transport of the motion-picture film, the image window or the film plane 12 is covered by the circular-disc-shaped mirror surface of the rotating mirror diaphragm 11 and the capture beam path A is deflected as video beam path V onto a ground glass screen 13, on which a frame corresponding to the film frame on the motion-picture film is imaged. The capture frame imaged on the ground glass screen 13 can be viewed by a viewer 8 via a first beam splitter 14 and an eyepiece 17 and be captured by an analog video assist system 2 in accordance with FIG. 1 or a digital video assist system 3 in accordance with FIG. 2.

A second beam splitter 16, which is arranged in the beam path between the ground glass screen 13 and the first beam splitter 14, reflects a frame field marking 15 or ground glass screen illumination onto the plane of the ground glass screen 13, such that the viewer 8 can view the capture frame in conjunction with frame field boundaries or in brightened fashion.

The video beam path V passing through the first beam splitter 14 to the analog or digital video assist system 2 or 3 is imaged onto the area of a video image sensor 5 by means of a video assist lens 4, which sensor converts the optical capture frame into video image signals.

In the case of the analog video assist system 2 illustrated schematically in FIG. 1, the video image sensor 5 is connected to a video assist electronic unit 6, which is constructed in accordance with the block diagram in FIGS. 3 and 4 and receives data and setting signals of the camera lens 10 via a signal line 18 or alternatively via a radio transmission network or the like.

Figure 5:
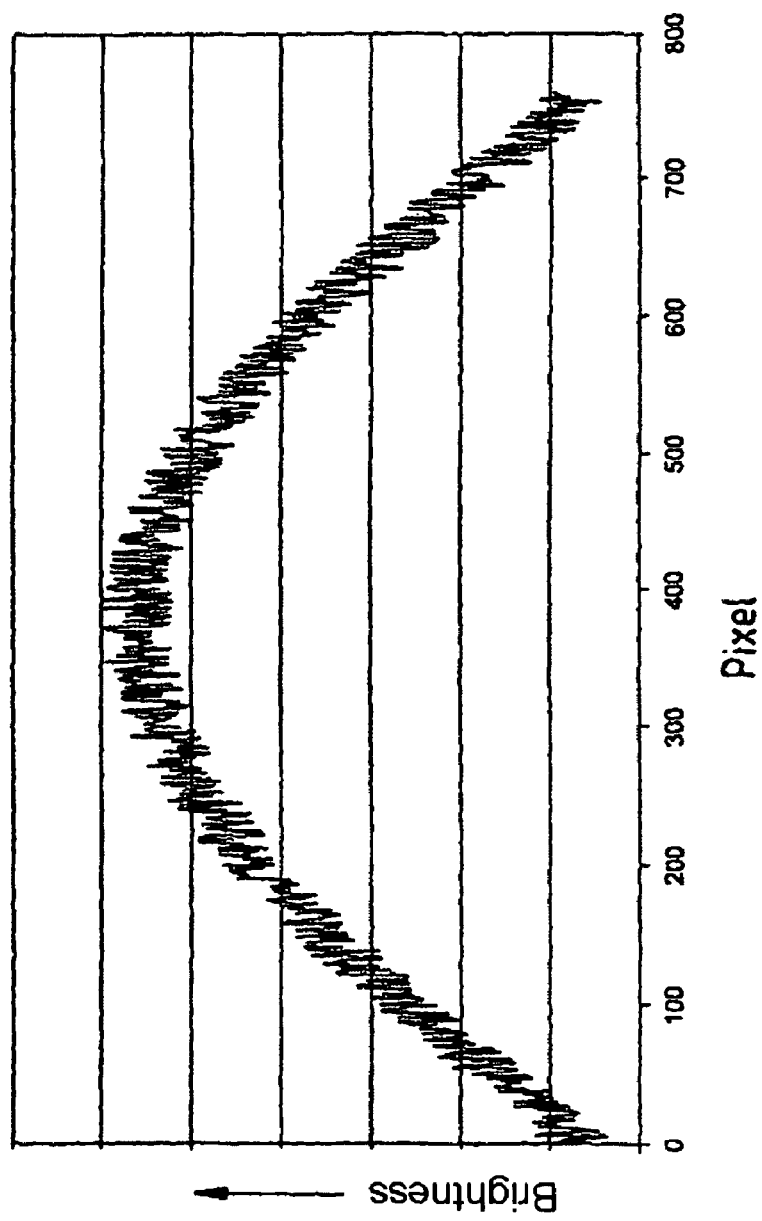
FIG. 5 shows the profile of the brightness values of the pixels of an upper or lower frame line—reaching into the frame corners—of a video image sensor.

The digital video assist system 3 illustrated in FIG. 2 is composed of a sensor unit 31, which contains the video assist lens 4 and the video image sensor 5, and a processing computer 32, which contains a digital video assist electronic unit 7, which can likewise be constructed analogously to the block diagrams of FIG. 4 or 5.

The video assist electronic unit 6 of the analog video assist system 2 and the video assist electronic unit 7 of the digital video assist system, respectively, are connected, besides the illustrated connection to the camera lens 10, via further signal lines to the camera controller and external control devices via which the video assist electronic unit 6 or 7, receives a diaphragm index signal from the motion-picture camera 1, said signal corresponding to the position or the diaphragm aperture angle of the rotating mirror diaphragm 11 with respect to the capture beam path A and corresponding to the respective exposure conditions of the video beam path V and thus to the exposure conditions on the video image sensor 5, camera status data and camera status signals or metadata, such as, for example, the film transport speed, information about the motion-picture film consumption, the charge state of the rechargeable battery, further information about the camera lens 10 in the form of the zoom and focus settings and the like and also time code signals.

On the output side, the video assist systems 2, 3 output the analog or digital assist signals generated from the image signals and also capture, control and/or status signals of the motion-picture camera 1 as metadata to a processing unit and also camera control signals to an electronic control unit of the motion-picture camera 1 for the setting of camera and accessory desired values and, through the connection of a monitor, enable viewing of the assist frames composed of the analog or digital assist signals directly at the video assist system 2, 3 and thus at or in direct proximity to the motion-picture camera 1.

The data and setting signals of the camera lens 10 comprise a coding of the camera lens 10 respectively used and also the setting of predefinable parameters of the camera lens 10, in particular of the iris diaphragm aperture of the camera lens 10. In order to eliminate the vignetting effect explained below, a signal indicating the diaphragm aperture of the video assist lens 4 is applied to the video assist electronic unit.

Figure 7:
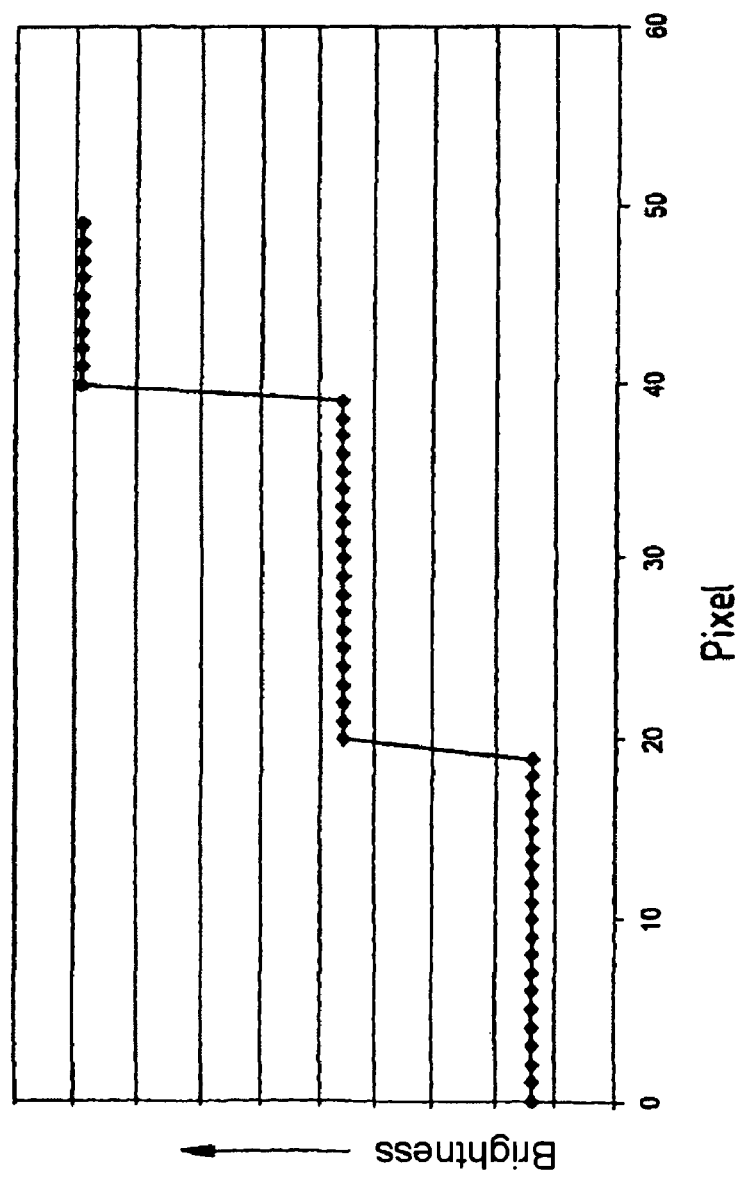
FIG. 7 shows an illustration of the brightness distribution—averaged over 20 pixels, of the first 50 pixels in accordance with FIG. 6.

The block diagram—illustrated in FIG. 3—of the video assist electronic unit 6 in accordance with FIG. 1 or 7 in accordance with FIG. 2 contains an image or color conditioning device 91, which is connected to the output of the video image sensor 5, which receives the capture frame imaged on the ground glass screen 13 via the video assist lens 4 and converts the optical image into video signals, an analog/digital (A/D) converter 92, which is connected to the output of the image or color conditioning device 91 and the output of which is connected both via frame stores 93, 94 and an amplifier 95 to a first input of a multiplier 96 and directly to a second input of the multiplier 96, and also an output-side digital/analog (D/A) converter 97, the output of which is connected to a processing unit described above, a monitor or the like.

In this embodiment, the video images generated by the video assist system are converted into a correctly colored video image, the frequency compensation between the frame capture frequency of the motion-picture camera and the video standard of the video assist system is performed, and this is followed by acquiring the video assist calibration frames for determining and storing the correction factors and, after the calibration, carrying out the subtraction of the correction values from the captured brightness values of the individual pixels.

Depending on the application or degree of equipment, the frame store 93, 94 can be subdivided into a frame store 93 for correcting the ground glass screen structure 93 and a frame store 94 for correcting vignetting effects and is connected to a controller 90, to which the additional signals and data of the camera lens 10 and of the video assist lens 5 are applied on the input side via signal lines 18, 40.

In an alternative embodiment, the video assist electronic unit can be constructed in accordance with the block diagram illustrated in FIG. 4, which differs from the embodiment in accordance with FIG. 3 to the effect that the image or color conditioning device 91 is not inserted into the connection of the output of the video image sensor 5 to the input of the analog/digital converter 92, but rather into the connection of the output of the digital/analog converter 97 to the output of the video assist electronic unit.

In this alternative embodiment, the raw data of the video image sensor are stored and the correction is carried out in the film capture operating mode. The frequency compensation likewise takes place at this point in the image processing, while the conversion of the colors and the conditioning of the video signal take place subsequently.

An explanation is given below of the function of the video assist electronic unit 6 illustrated in the block diagram in FIGS. 3 and 4 for the analog video assist system 2 or respectively 7 for the digital video assist system 3 with respect to eliminating or reducing ground glass screen-based frame faults.

In order—for eliminating ground glass screen-based frame faults, firstly to eliminate or filter out the unavoidable, randomly occurring inherent noise of the video image sensor that varies from video image to video image and from pixel to pixel, a plurality of video images are captured and average values of the brightness over the plurality of video images are determined. Said average values are subsequently used for a representation of the video images from which the inherent noise of the video image sensor has been eliminated.

The profile—illustrated in FIG. 5—of the brightness values of the pixels of a frame line of the video image sensor in an upper or lower line reaching into the region of the frame corners is manifested for a video camera or a video assist system without inherent noise. It can be gathered from this illustration that a brightness profile that decreases continuously from the frame sensor to the frame sides is superimposed on the frame-dependent brightness fluctuations of the pixels. This vignetting effect is attributable to the type of camera lens used, the diaphragm aperture thereof and the type of video assist lens used and the diaphragm aperture thereof. If it is assumed that the video assist lens used with the video assist system used is known, the camera lens used, the diaphragm aperture thereof and the diaphragm aperture of the video assist lens remain as parameters.

The brightness fluctuations from pixel to pixel of a frame line that are illustrated in FIG. 5 are, however, not just attributable to the brightness fluctuations of the pixels of a capture frame, but rather also comprise frame faults caused by the ground glass screen structure.

Figure 6:
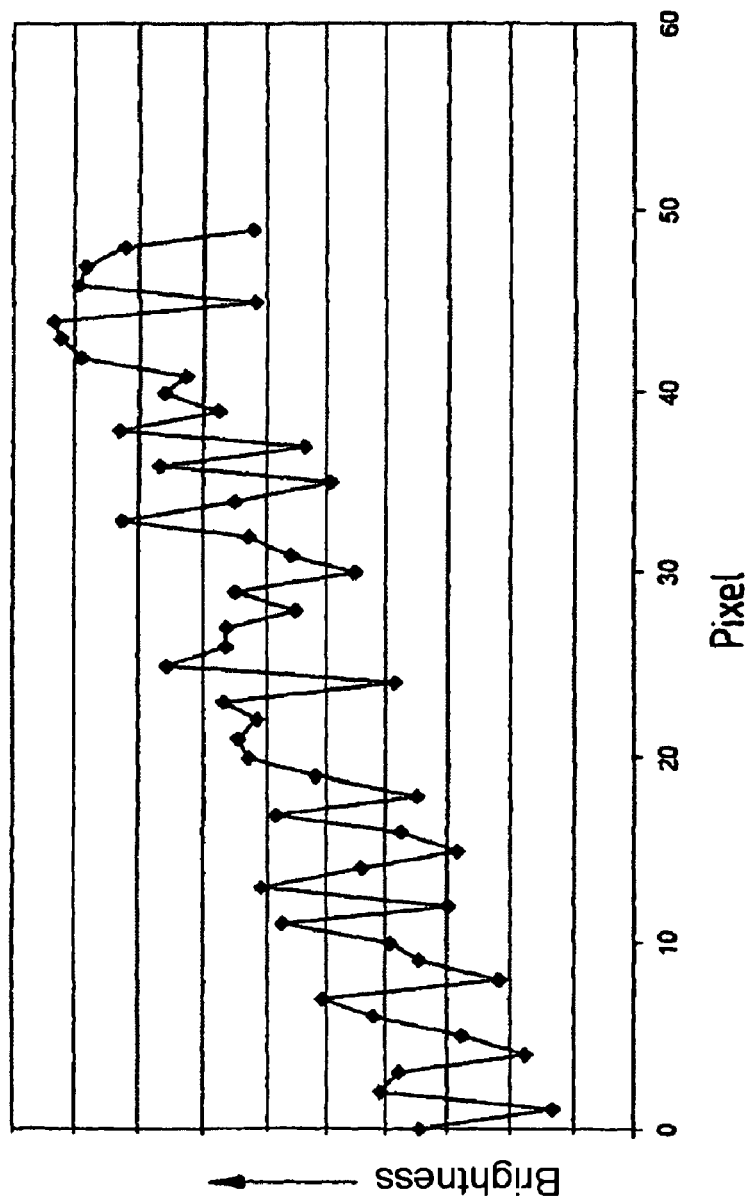
FIG. 6 shows an enlarged illustration of the brightness values of the first 50 pixels of the brightness distribution in accordance with FIG. 5.

FIG. 6 shows, in an enlarged illustration, the profile of the brightness of the first 50 pixels of the pixels of an upper or lower frame line that are illustrated in FIG. 5 and shows the extent of the brightness fluctuations in this quasi "zoomed" region of the brightness profile of the pixels of a frame line.

In order to separate the influence of the invariable ground glass screen structure, which is exclusively dependent on the ground glass screen, from the vignetting effect, which is dependent on the parameters referred to above, in accordance with FIG. 7 an average value of the brightness distribution is determined over a predefinable number of pixels, over 20 pixels of a frame line in the exemplary embodiment illustrated. In the case of the brightness distribution illustrated in FIG. 6, the average values of the brightness values of the first 50 pixels of this frame line that are illustrated in FIG. 7 are produced.

As an alternative and for practical improvement of accuracy, it is possible to determine the average value of the brightness distribution over an area of, for example, 10×10 or 20×20 pixels.

Figure 8:
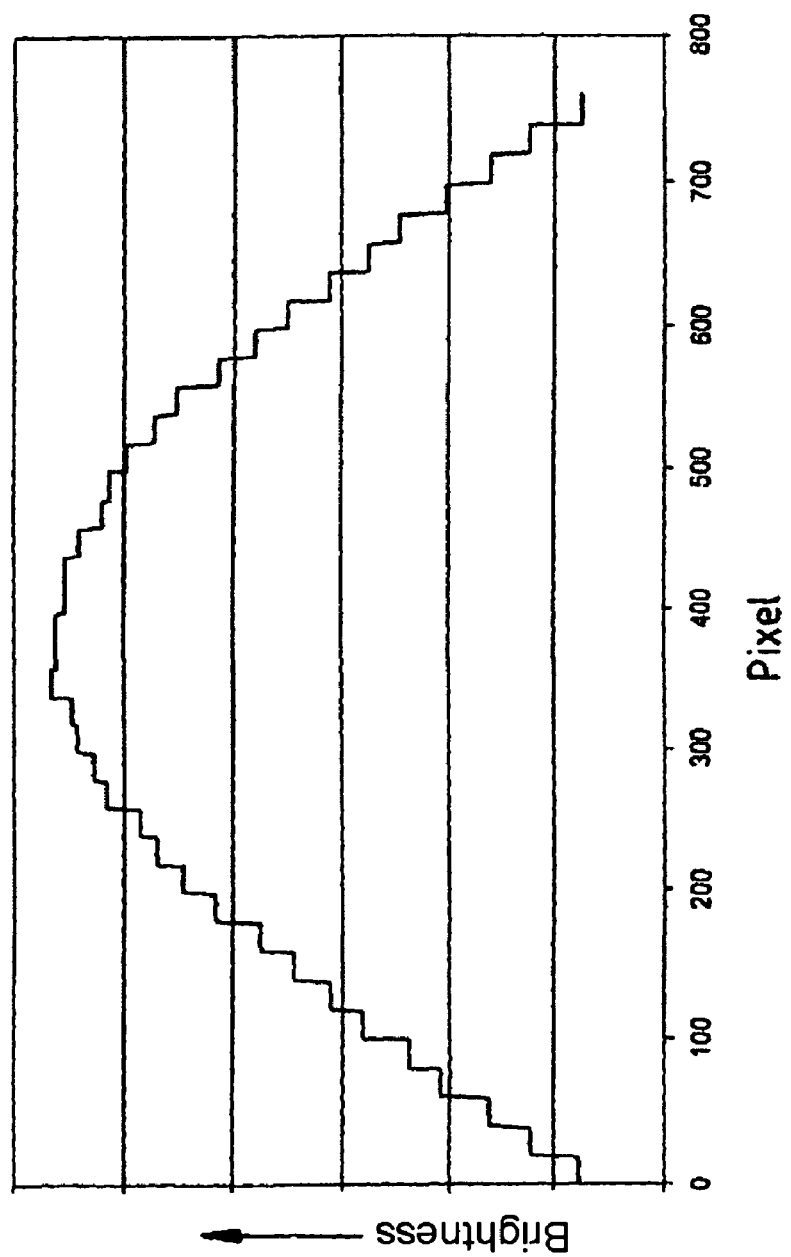
FIG. 8 shows an illustration of a correction of the vignetting effect by means of a brightness distribution—averaged over 20 pixels in each case—of the pixels of an upper or lower line in accordance with FIGS. 5 and 7.

If the averaging of the first 50 pixels of a frame line as illustrated in FIG. 7 is applied to the pixels of the entire frame line, then the averaging over in each case 20 pixels of the chosen frame line as illustrated in FIG. 8 is produced. This staircase-shaped curve indicates the correction factors for eliminating or reducing the vignetting effect. Brightness differences within a step of the curve illustrated in FIG. 8 which remain the same over an arbitrarily selectable multiplicity of video assist frames therefore indicate, taking account of the inherent noise, the brightness deviations which are attributable to the ground glass screen structure. Accordingly, the correction factors assigned to the individual pixels can take account of the frame faults attributable to the ground glass screen structure and output an image signal from which the ground glass screen-based frame faults on account of the ground glass screen structure and the vignetting effect have been eliminated.

The invention claimed is:

1. A method for automatically correcting frame faults in video assist frames of a video assist system in a video beam path branched off from a capture beam path of a motion-picture camera, wherein a ground glass screen is arranged in said video beam path, wherein
the video assist system is calibrated by capturing a plurality of video assist calibration frames of a single-colored, unstructured and uniformly illuminated, flat capture object using at least one of different camera lenses or different diaphragm apertures of the camera lenses or different diaphragm apertures of a video assist lens,
the brightness values of a plurality of areas of the video assist calibration frames are stored depending on the camera lenses used or the different diaphragm apertures of the camera lenses used or the different diaphragm apertures of the video assist lens used, and
the stored brightness values of the plurality of areas of the video assist calibration frames are superimposed on the video assist frames captured after calibration, wherein the brightness values of the pixels of a plurality of video assist calibration frames captured using the same camera lens are captured with the setting of the camera lens or the diaphragm aperture of the camera lens remaining constant and the setting of the diaphragm aperture of a video assist lens remaining constant and an average value of the brightness of all the pixels of the captured video assist calibration frames is formed, which is assigned to the individual pixels of the video assist frames captured after the calibration.

2. The method of claim 1, wherein brightness values of the individual pixels of the video assist calibration frame are stored together with the address of the individual pixels in a frame store, in that the stored brightness values of the pixels of a pixel group are used to form an average value of the brightness of said pixel group, in that a correction factor is calculated from the deviation of the brightness values of individual pixels from the average value of the brightness of the pixel group, and in that the brightness values of the pixels of the video assist frames captured after the calibration are combined with the correction factor and output as corrected pixel brightness values to a display or further processing unit.

3. The method of claim 2, wherein the brightness values of the individual pixels of a plurality of video assist calibration frames are captured for different settings of the camera lens and are stored in conjunction with the respective setting of the camera lens and the assigned addresses of the individual pixels in the frame store, in that an average value of the brightness of a predefined pixel group is formed, in that a correction factor $$V_{ME} = I_{PG}/I_N$$

is determined for each individual pixel for the respective setting of the camera lens, where $I_{PG}$ is the average value of the brightness of the predefined pixel group and $I_N$ is the brightness value of each individual pixel, and in that the individual pixels of the video assist frames captured after the calibration are multiplied by the correction factor.

4. The method of claim 2, wherein the brightness values of the individual pixels of a plurality of video assist calibration frames are captured for different diaphragm apertures of the camera lens and are stored in conjunction with the respective diaphragm aperture or F-number and the assigned addresses of the individual pixels in the frame store, in that an average value of the brightness of a predefined pixel group is formed, in that a correction factor $$V_{MB} = I_{PG}/I_N$$

is determined for each individual pixel for the respective diaphragm aperture or F-number of the camera lens, where $I_{PG}$ is the average value of the brightness of the predefined pixel group and $I_N$ is the brightness value of each individual pixel, and in that the individual pixels of the video assist frames captured after the calibration are multiplied by the correction factor.

5. The method of claim 2, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, in that a correction factor $$V_M = V_{MA} * C * BZ$$

is determined for each individual pixel, where $V_{MA}$ is the correction factor for each individual pixel for maximum stopping down of the camera lens, C is a constant dependent on the video assist system, and BZ is the F-number, and in that the individual pixels of the video assist frames captured after the calibration are multiplied by the correction factor.

6. The method of claim 4, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, in that a correction factor $$V_M = V_{MA} * C * BZ^2$$

is determined for each individual pixel, where $V_{MA}$ is the correction factor for each individual pixel for maximum stopping down of the camera lens, C is a constant dependent on the video assist system, and $BZ^2$ is the square of the F-number, and in that the individual pixels of the video assist frames captured after the calibration are multiplied by the correction factor.

7. The method of claim 2, wherein the difference between the brightness values of adjacent pixels or pixel groups is determined and only those pixels for which the deviation of the brightness values is less than a predefined value are multiplied by a correction factor.

8. The method of claim 7, wherein only those pixels for which the deviation of the brightness values is less than or equal to 50% are multiplied by a correction factor.

9. The method of claim 2, wherein the pixel group comprises a predefined number of adjacent pixels.

10. The method of claim 2, wherein the pixel group comprises a number of pixels arranged in distributed fashion over the video assist frame.

11. An apparatus for automatically correcting frame faults in video assist frames of a video assist system connected to a motion-picture camera comprising a camera lens, which is arranged in a film capture beam path of said motion-picture camera,
    said video assist system comprising a video assist lens, a video image sensor and a controller,
    said video assist lens being directed at a ground glass screen being arranged in a video beam path branched off from a film capture beam path of said motion-picture camera,
    said video assist system being calibrated by capturing at least one video assist frame of a single-colored, unstructured and uniformly illuminated, flat capture object for a predefined diaphragm aperture of said camera lens,
    said video assist system storing said captured video assist frame as a video assist calibration frame in a frame store,
    said controller receiving setting and status data of a camera lens signals indicating the diaphragm aperture of the video assist lens and the type of camera lens and said controller being connected to said frame store
    said video assist system inverting said video assist calibration frame and superimposing said inverted video assist calibration frame on the video assist frames captured after calibration.

12. The apparatus of claim 11, further comprising a frame store that stores data for the correction of the ground glass screen structure and of vignetting effects.

13. The apparatus of claim 11, wherein the output of the video image sensor is connected to the input of an image or color conditioning, the output of which is connected via an A/D converter both to the frame store and to a first input of a multiplier, a second input of which is connected to the output of an amplifier connected to the output of the frame store and the output of which is connected to the input of a D/A converter.

14. The apparatus of claim 11, wherein the output of the video image sensor is connected via an A/D converter both to the frame store and to a first input of a multiplier, a second input of which is connected to the output of an amplifier connected to the output of the frame store and the output of which is connected via a D/A converter to the input of an image or color conditioning.

15. The apparatus of claim 11, comprising an analog video assist system with a video assist lens directed at the ground glass screen and the video image sensor connected to a video assist electronic unit.

16. The apparatus of claim 11, comprising a digital video assist system with a video assist lens directed at the ground glass screen, the video image sensor and a processing computer for the digital video assist system, which computer contains a digital video assist electronic unit and on the input side is both connected to the video image sensor and has applied to it a signal indicating the data of the camera lens.

17. A method for automatically correcting frame faults in video assist frames of a video assist system in a video beam path branched off from a capture beam path of a motion-picture camera having a ground glass screen arranged in said video beam path, the method comprising calibrating the video assist system by capturing at least one video assist frame of a single-colored, unstructured and uniformly illuminated, flat capture object for a predefined diaphragm aperture of a camera lens and storing it as a video assist calibration frame in a frame store, and superimposing a stored and inverted video assist calibration frame on the video assist frames captured after the calibration, wherein brightness values of pixels of a plurality of video assist calibration frames captured using the same camera lens are captured with a setting of the camera lens or the diaphragm aperture of the camera lens remaining constant and the setting of a diaphragm aperture of a video assist lens remaining constant and an average value of a brightness of all the pixels of the captured video assist calibration frames is formed, which is assigned to individual pixels of the video assist frames captured after the calibration.

18. A method for automatically correcting frame faults in video assist frames of a video assist system in a video beam path branched off from a capture beam path of a motion-picture camera having a ground glass screen arranged in said video beam path, the method comprising calibrating the video assist system by capturing at least one video assist frame of a single-colored, unstructured and uniformly illuminated, flat capture object for a predefined diaphragm aperture of a camera lens and storing it as a video assist calibration frame in a frame store, and superimposing a stored and inverted video assist calibration frame on the video assist frames captured after the calibration, wherein brightness values of individual pixels of the video assist calibration frame are stored together with an address of the individual pixels in a frame store, in that the stored brightness values of the pixels of a pixel group are used to form an average value of a brightness of said pixel group, in that a correction factor is calculated from the deviation of a brightness values of individual pixels from the average value of the brightness of the pixel group, and in that the brightness values of the pixels of the video assist frames captured after the calibration are combined with the correction factor and output as corrected pixel brightness values to a display or further processing unit.

19. The method of claim 18, wherein the brightness values of the individual pixels of a plurality of video assist calibration frames are captured for different settings of the camera lens and are stored in conjunction with the respective setting of the camera lens and the assigned addresses of the individual pixels in the frame store, in that an average value of the brightness of a predefined pixel group is formed, in that a correction factor $$V_{ME} = I_{PG}/I_N$$

is determined for each individual pixel for a respective setting of the camera lens, where $I_{PG}$ is the average value of the brightness of the predefined pixel group and $I_N$ is the brightness value of each individual pixel, and in that individual pixels of the video assist frames captured after the calibration are multiplied by the correction factor.

20. The method of claim 18, wherein the brightness values of the individual pixels of a plurality of video assist calibration frames are captured for different diaphragm apertures of the camera lens and are stored in conjunction with the respective diaphragm aperture or F-number and the assigned addresses of the individual pixels in the frame store, in that an average value of the brightness of a predefined pixel group is formed, in that a correction factor $$V_{MB}=I_{PG}/I_N$$

is determined for each individual pixel for the respective diaphragm aperture or F-number of the camera lens, where $I_{PG}$ is the average value of the brightness of the predefined pixel group and $I_N$ is the brightness value of each individual pixel, and in that the individual pixels of the video assist frames captured after the calibration are multiplied by the correction factor.

21. The method of claim 20, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, in that a correction factor $$V_M=V_{MA}*C*BZ$$

is determined for each individual pixel, where $V_{MA}$ is the correction factor for each individual pixel for maximum stopping down of the camera lens, C is a constant dependent on the video assist system, and BZ is the F-number, and in that the individual pixels of the video assist frames captured after the calibration are multiplied by the correction factor.

22. The method of claim 20, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, in that a correction factor $$V_M=V_{MA}*C*BZ^2$$

is determined for each individual pixel, where $V_{MA}$ is the correction factor for each individual pixel for maximum stopping down of the camera lens, C is a constant dependent on the video assist system, and $BZ^2$ is the square of the F-number, and in that the individual pixels of the video assist frames captured after the calibration are multiplied by the correction factor.

23. The method of claim 18, wherein a difference between the brightness values of adjacent pixels or pixel groups is determined and only those pixels for which the deviation of the brightness values is less than a predefined value are multiplied by a correction factor.

24. The method of claim 23, wherein only those pixels for which the deviation of the brightness values is less than or equal to 50% are multiplied by a correction factor.

25. The method of claim 18, wherein the pixel group comprises a predefined number of adjacent pixels.

26. The method of claim 18, wherein the pixel group comprises a number of pixels arranged in distributed fashion over the video assist frame.

27. An apparatus for carrying out a method for automatically correcting frame faults in video assist frames of a video assist system in a video beam path branched off from a capture beam path of a motion-picture camera, wherein a ground glass screen is arranged in said video beam path, wherein the video assist system is calibrated by capturing at least one video assist frame of a single-colored, unstructured and uniformly illuminated, flat capture object for a predefined diaphragm aperture of a camera lens and storing it as a video assist calibration frame in a frame store, and wherein a stored and inverted video assist calibration frame is superimposed on the video assist frames captured after the calibration, said apparatus comprising a video assist system connected to the motion-picture camera and containing a video assist lens, which is directed at a ground glass screen arranged in a video beam path branched off from the capture beam path of the motion-picture camera, a video image sensor and a controller, to which setting and status data of a camera lens arranged in the film capture beam path of the motion-picture camera are applied and which is connected to a frame store, wherein an output of the video image sensor is connected to an input of an image or color conditioning, an output of which is connected via an A/D converter both to the frame store and to a first input of a multiplier, a second input of which is connected to an output of an amplifier connected to an output of the frame store and an output of which is connected to the input of a D/A converter.

28. An apparatus for carrying out a method for automatically correcting frame faults in video assist frames of a video assist system in a video beam path branched off from a capture beam path of a motion-picture camera, wherein a ground glass screen is arranged in said video beam path, wherein the video assist system is calibrated by capturing at least one video assist frame of a single-colored, unstructured and uniformly illuminated, flat capture object for a predefined diaphragm aperture of a camera lens and storing it as a video assist calibration frame in a frame store, and wherein a stored and inverted video assist calibration frame is superimposed on the video assist frames captured after the calibration, said apparatus comprising a video assist system connected to the motion-picture camera and containing a video assist lens, which is directed at a ground glass screen arranged in a video beam path branched off from the capture beam path of the motion-picture camera, a video image sensor and a controller, to which setting and status data of a camera lens arranged in the film capture beam path of the motion-picture camera are applied and which is connected to a frame store, wherein an output of the video image sensor is connected via an A/D converter both to the frame store and to a first input of a multiplier, a second input of which is connected to an output of an amplifier connected to an output of the frame store and an output of which is connected via a D/A converter to the input of an image or color conditioning.

29. A method for automatically correcting frame faults in video assist frames of a video assist system in a video beam path branched off from a capture beam path of a motion-picture camera, a ground glass screen being arranged in said video beam path, wherein the video assist system is calibrated by capturing at least one video assist calibration frame of a single-colored, unstructured and uniformly illuminated, flat capture object using a chosen camera lens, a predetermined diaphragm aperture of the camera lens, a predetermined diaphragm aperture of a video assist lens and said ground glass screen, the brightness values of the pixels of said video assist calibration frame captured using said chosen camera lens and the diaphragm aperture of the camera lens remaining constant and the setting of the diaphragm aperture of a video assist lens remaining constant and said ground glass screen and an average value of the brightness of all the pixels of the captured video assist calibration frame is formed, which is assigned to the individual pixels of the video assist frames captured after the calibration the brightness values of the pixels of the video assist calibration frame is stored depending on the camera lens used, and the stored brightness values of the video assist calibration frame are superimposed on the video assist frames captured after calibration.

30. The method of claim 29, wherein brightness values of the individual pixels of the video assist calibration frame are stored together with the address of the individual pixels in a frame store, wherein the stored brightness values of the pixels of a pixel group are used to form an average value of the brightness of said pixel group, wherein a correction factor is calculated from the deviation of the brightness values of individual pixels from the average value of the brightness of the pixel group, and wherein the brightness values of the pixels of the video assist frames captured after the calibration are combined with the correction factor and output as corrected pixel brightness values to a display or further processing unit.

31. The method of claim 30, wherein the brightness values of the individual pixels of a plurality of video assist calibration frames are captured for different settings of the diaphragm of the camera lens and are stored in conjunction with the respective diaphragm setting of the camera lens and the assigned addresses of the individual pixels in the frame store, wherein an average value of the brightness of a predefined pixel group is formed, in that a correction factor $$V_{ME}=I_{PG}/I_N$$

is determined for each individual pixel for the respective setting of the camera lens, where $I_{PG}$ is the average value of the brightness of the predefined pixel group and $I_N$ is the brightness value of each individual pixel, and wherein the individual pixels of the video assist frames captured after the calibration are multiplied by the correction factor.

32. The method of claim 30, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, wherein a correction factor $$V_M=V_{MA}*C*BZ$$

is determined for each individual pixel, where $V_{MA}$ is the correction factor for each individual pixel for maximum stopping down of the camera lens, C is a constant dependent on the video assist system, and BZ is the F-number, and wherein the individual pixels of the video assist frames captured after the calibration are multiplied by the correction factor.

33. The method of claim 30, wherein the brightness values of the individual pixels of a plurality of video assist calibration frames are captured for different diaphragm apertures of the camera lens and are stored in conjunction with the respective diaphragm aperture or F-number and the assigned addresses of the individual pixels in the frame store, wherein an average value of the brightness of a predefined pixel group is formed, wherein a correction factor $$V_{MB}=I_{PG}/I_N$$

is determined for each individual pixel for the respective diaphragm aperture or F-number of the camera lens, where $I_{PG}$ is the average value of the brightness of the predefined pixel group and $I_N$ is the brightness value of each individual pixel, and wherein the individual pixels of the video assist frames captured after the calibration are multiplied by the correction factor.

34. The method of claim 33, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, wherein a correction factor $$V_M=V_{MA}*C*BZ^2$$

is determined for each individual pixel, where $V_{MA}$ is the correction factor for each individual pixel for maximum stopping down of the camera lens, C is a constant dependent on the video assist system, and $BZ^2$ is the square of the F-number, and wherein the individual pixels of the video assist frames captured after the calibration are multiplied by the correction factor.

35. A method for automatically correcting frame faults in video assist frames of a video assist system in a video beam path branched off from a capture beam path of a motion-picture camera, a ground glass screen being arranged in said video beam path, wherein the video assist system is calibrated by capturing a plurality of video assist calibration frames of a single-colored, unstructured and uniformly illuminated, flat capture object using at least one of different camera lenses or at least one of different diaphragm apertures of the camera lenses or at least one of different diaphragm apertures of a video assist lens, the brightness values of the pixels of said plurality of video assist calibration frames captured using the same camera lens are captured with the setting of the camera lens or the diaphragm aperture of the camera lens remaining constant and the setting of the diaphragm aperture of a video assist lens remaining constant and an average value of the brightness of all the pixels of the captured video assist calibration frames is formed, which is assigned to the individual pixels of the video assist frames captured after the calibration, the brightness values of the pixels of the plurality of video assist calibration frames are stored depending on the at least one of different camera lenses used or at least one of different diaphragm apertures of the camera lenses used or at least one of different diaphragm apertures of a video assist lens used, and the stored brightness values of the plurality of areas of the video assist calibration frames are superimposed on the video assist frames captured after calibration.

36. The method of claim 35, wherein brightness values of the individual pixels of the video assist calibration frame are stored together with the address of the individual pixels in a frame store, wherein the stored brightness values of the pixels of a pixel group are used to form an average value of the brightness of said pixel group, wherein a correction factor is calculated from the deviation of the brightness values of individual pixels from the average value of the brightness of the pixel group, and wherein the brightness values of the pixels of the video assist frames captured after the calibration are combined with the correction factor and output as corrected pixel brightness values to a display or further processing unit.

37. The method of claim 36, wherein the brightness values of the individual pixels of a plurality of video assist calibration frames are captured for different settings of the diaphragm of the camera lens and are stored in conjunction with the respective diaphragm setting of the camera lens and the assigned addresses of the individual pixels in the frame store, wherein an average value of the brightness of a predefined pixel group is formed, in that a correction factor $$V_{ME}=I_{PG}/I_N$$

is determined for each individual pixel for the respective setting of the camera lens, where $I_{PG}$ is the average value of the brightness of the predefined pixel group and $I_N$ is the brightness value of each individual pixel, and wherein the individual pixels of the video assist frames captured after the calibration are multiplied by the correction factor.

38. The method of claim 36, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, wherein a correction factor $$V_M=V_{MA}*C*BZ$$

is determined for each individual pixel, where $V_{MA}$ is the correction factor for each individual pixel for maximum stopping down of the camera lens, C is a constant dependent on the video assist system, and BZ is the F-number, and wherein the individual pixels of the video assist frames captured after the calibration are multiplied by the correction factor.

39. The method of claim 36, wherein the brightness values of the individual pixels of a plurality of video assist calibration frames are captured for different diaphragm apertures of the camera lens and are stored in conjunction with the respective diaphragm aperture or F-number and the assigned addresses of the individual pixels in the frame store, wherein an average value of the brightness of a predefined pixel group is formed, wherein a correction factor $$V_{MB}=I_{PG}/I_N$$

is determined for each individual pixel for the respective diaphragm aperture or F-number of the camera lens, where $I_{PG}$ is the average value of the brightness of the predefined pixel group and $I_N$ is the brightness value of each individual pixel, and wherein the individual pixels of the video assist frames captured after the calibration are multiplied by the correction factor.

40. The method of claim 39, wherein the brightness values of the pixels of a video assist calibration frame are captured for the smallest possible diaphragm or largest possible F-number of the camera lens and are stored in conjunction with the respective diaphragm aperture or F-number and the assigned addresses of the individual pixels in the frame store, wherein a correction factor $$V_M=V_{MA}*C*BZ^2$$

is determined for each individual pixel, where $V_{MA}$ is the correction factor for each individual pixel for maximum stopping down of the camera lens, C is a constant dependent on the video assist system, and $BZ^2$ is the square of the F-number, and wherein the individual pixels of the video assist frames captured after the calibration are multiplied by the correction factor.

41. A method for automatically correcting frame faults in video assist frames of a video assist system in a video beam path branched off from a capture beam path of a motion-picture camera, a ground glass screen being arranged in said video beam path, wherein
the video assist system is calibrated by capturing a plurality of pixel groups of at least one video assist calibration frame of a single-colored, unstructured and uniformly illuminated, flat capture object using a predetermined camera lens, a predetermined setting of the diaphragm aperture of the predetermined camera lens, a predetermined setting of the diaphragm aperture of a video assist lens,
the brightness values of the plurality of pixel groups of the video assist calibration frame are captured for said camera lens, said predetermined setting of the diaphragm aperture of said camera lens and said predetermined setting of diaphragm aperture of said video assist lens are stored together with the indication of said camera lens, said setting of the diaphragm aperture of the camera lens, said setting of the diaphragm aperture of the video assist lens and an addressing of the pixel groups in the frame store, in that a vignetting correction factor $$V=IG_{MAX}/IG_N$$

is determined for each pixel group and stored, where $IG_{MAX}$ is the brightness of the brightest pixel in the frame center of the video assist calibration frame and $IG_N$ is the brightness value of the relevant pixel group, and wherein the brightness values of the pixels of the video image sensor of the video assist system for the video assist frames captured after the calibration, depending on the camera lens used, the setting of the diaphragm aperture of the camera lens and the setting of the diaphragm aperture of the video assist lens are combined with the vignetting correction factor, and
the stored brightness values of the plurality of pixel groups of the video assist calibration frame are superimposed on the video assist frames captured after calibration.

42. The method of claim 41, wherein the difference between the brightness values of adjacent pixels or pixel groups is determined and only those pixels for which the deviation of the brightness values is less than a predefined value are multiplied by a correction factor.

43. The method of claim 42, wherein only those pixels for which the deviation of the brightness values is less than or equal to 50% are multiplied by a correction factor.

44. The method of claim 41, wherein the pixel group comprises a predefined number of adjacent pixels.

45. The method of claim 41, wherein the pixel group comprises a number of pixels arranged in distributed fashion over the video assist frame.

46. A method for automatically correcting frame faults in video assist frames of a video assist system in a video beam path branched off from a capture beam path of a motion-picture camera, a ground glass screen being arranged in said video beam path, wherein
the video assist system is calibrated by capturing a plurality of pixel groups of video assist calibration frames or of the video assist calibration frames of a single-colored, unstructured and uniformly illuminated, flat capture object using at least one of different camera lenses, different settings of the diaphragm apertures of the camera lenses and different settings of the diaphragm apertures of a video assist lens,
the brightness values of the plurality of pixel groups of the video assist calibration frame or of the video assist calibration frames are captured for different camera lenses, different settings of the diaphragm aperture of the camera lens and different diaphragm aperture of the video assist lens and are stored together with the indication of the respective camera lens, the settings of the diaphragm aperture of the camera lens, the settings of the diaphragm apertures of the video assist lens and an addressing of the pixel groups in the frame store, in that a vignetting correction factor $$V = IG_{MAX}/IG_N$$

is determined for each pixel group and stored, where $IG_{MAX}$ is the brightness of the brightest pixel in the frame center of the video assist calibration frame and $IG_N$ is the brightness value of the relevant pixel group, and in that the brightness values of the pixels of the video image sensor of the video assist system for the video assist frames captured after the calibration, depending on the camera lens used, the setting of the diaphragm aperture of the camera lens and the setting of the diaphragm aperture of the video assist lens are combined with the vignetting correction factor, and the stored brightness values of the plurality of pixel groups of the video assist calibration frame or of the video assist calibration frames are superimposed on the video assist frames captured after calibration.

47. The method of claim 46, wherein the difference between the brightness values of adjacent pixels or pixel groups is determined and only those pixels for which the deviation of the brightness values is less than a predefined value are multiplied by a correction factor.

48. The method of claim 47, wherein only those pixels for which the deviation of the brightness values is less than or equal to 50% are multiplied by a correction factor.

49. The method of claim 46, wherein the pixel group comprises a predefined number of adjacent pixels.

50. The method of claim 46, wherein the pixel group comprises a number of pixels arranged in distributed fashion over the video assist frame.

51. A method for automatically correcting frame faults in video assist frames of a video assist system in a video beam path branched off from a capture beam path of a motion-picture camera, wherein a ground glass screen is arranged in said video beam path, wherein the video assist system is calibrated by capturing a plurality of video assist calibration frames of a single-colored, unstructured and uniformly illuminated, flat capture object using different camera lenses, different settings of the diaphragm aperture of a camera lens and different settings of the diaphragm aperture of a video assist lens, the brightness values of said plurality of pixel groups of the video assist calibration frame or of the video assist calibration frames are stored together with an indication of the respective camera lens, the settings of the diaphragm aperture of the camera lens, the setting of the diaphragm aperture of the video assist lens and an addressing of the pixel groups in the frame store, a vignetting correction factor $$V_V = IG_{MAX}/IG_N$$

is determined for each pixel group and stored, where $IG_{MAX}$ is the brightness of the brightest pixel in the frame center of the video assist calibration frame and $IG_N$ is the brightness value of the relevant pixel group, and the brightness values of the pixels of the video image sensor of the video assist system for the video assist frames captured after a calibration, depending on the camera lens used, the setting of the diaphragm aperture of the camera lens and the setting of the diaphragm aperture of the video assist lens are combined with the vignetting correction factor.

* * * * *

UNITED STATES PATENT AND TRADEMARK OFFICE
CERTIFICATE OF CORRECTION

PATENT NO. : 8,218,034 B2
APPLICATION NO. : 12/087166
DATED : July 10, 2012
INVENTOR(S) : Klaus Jacumet It is certified that error appears in the above-identified patent and that said Letters Patent is hereby corrected as shown below:

In the Claims

Column 16, Claim 16, line 8    Delete "computer"

Signed and Sealed this
Twenty-fifth Day of December, 2012

David J. Kappos
*Director of the United States Patent and Trademark Office*